Dec. 15, 1964    W. W. ROBINSON, JR., ET AL    3,161,286
AUTOMATIC CONVEYER CUTOFF

Filed Jan. 24, 1963    2 Sheets-Sheet 2

INVENTORS
WILLIAM W. ROBINSON, JR
BY DEMPSIE C. CAMP

Cushman, Darby Cushman
ATTORNEYS

3,161,286
AUTOMATIC CONVEYER CUTOFF
William W. Robinson, Jr., Signal Mountain, and Dempsie C. Camp, Dunlap, Tenn., assignors to Cumberland Case Company, Chattanooga, Tenn., a corporation of Tennessee
Filed Jan. 24, 1963, Ser. No. 253,710
7 Claims. (Cl. 198—232)

This invention relates to conveyer controls and more particularly to apparatus for rendering an automatic conveyer inoperative during servicing of the conveyer mechanism. On many modern farms, particularly poultry and livestock raising farms, the animals are automatically fed from troughs in the feeding area in which feed is propelled from a central hopper by a plurality of endless conveyers in the form of chains having feed pushers mounted on them. Generally, the chains are either continuously driven at a very slow pace or are controlled by an automatic timer to start and stop at various preset intervals. Typically a single mechanical feeder unit will include four loops or circuits of trough and conveyer chain. In such a mechanical feeder unit the indexing feeding conveyers are driven by sprockets secured to a common drive shaft by shear pins and the drive shaft is controlled by an automatic timer mechanism. The automatic timer is generally set to intermittently operate the conveyer drive motor, for instance, 15 minutes out of each hour. The conveyer drive sprockets are separately pinned to the drive shaft so that the jamming of any single conveyer, for any reason, will allow its shear pin to shear leaving the other sprockets operatively connected to the drive shaft.

Should the operator, upon entering the broiler house, find that the conveyer unit is operating but that one of the conveyer chains is not moving, he realizes that one of the pins has sheared and that he must free the obstruction that has jammed the chain and replace the shear pin. While the operator is attending to the chain itself or other chores in the broiler house, it is possible that the automatic timer will cut the conveyer unit off so that when the operator begins to replace the broken shear pin, none of the drive sprockets are being driven. The operator may then forgetfully begin to replace the broken shear pin without cutting the conveyer out of the automatic timer circuit. Should the unit automatically turn on while the operator is involved in replacing the pin, there is great danger of his being injured. However, by using the automatic conveyer cutoff of the invention, it is impossible for the operator to have access to the drive sprocket without disengaging the drive motor from the drive shaft so that even a careless operator will not be injured through his forgetfulness.

It is therefore an object of the present invention to provide an automatic conveyer cutoff that will prevent the operation of the conveyer during checking and repair of the conveyer drive mechanism.

It is a further object of the present invention to provide a mechanical automatic conveyer cutoff that is operable at the location of an automatic timing mechanism actuated feed conveyer drive mechanism to render the conveyer inoperable during servicing regardless of the actuating of the automatic timing mechanism.

These and other objects of the present invention are more fully set forth in the detailed explanation following in which reference is made to the attached drawings.

An illustrative embodiment of the present invention is shown in the attached drawings in which.

Figure 1:
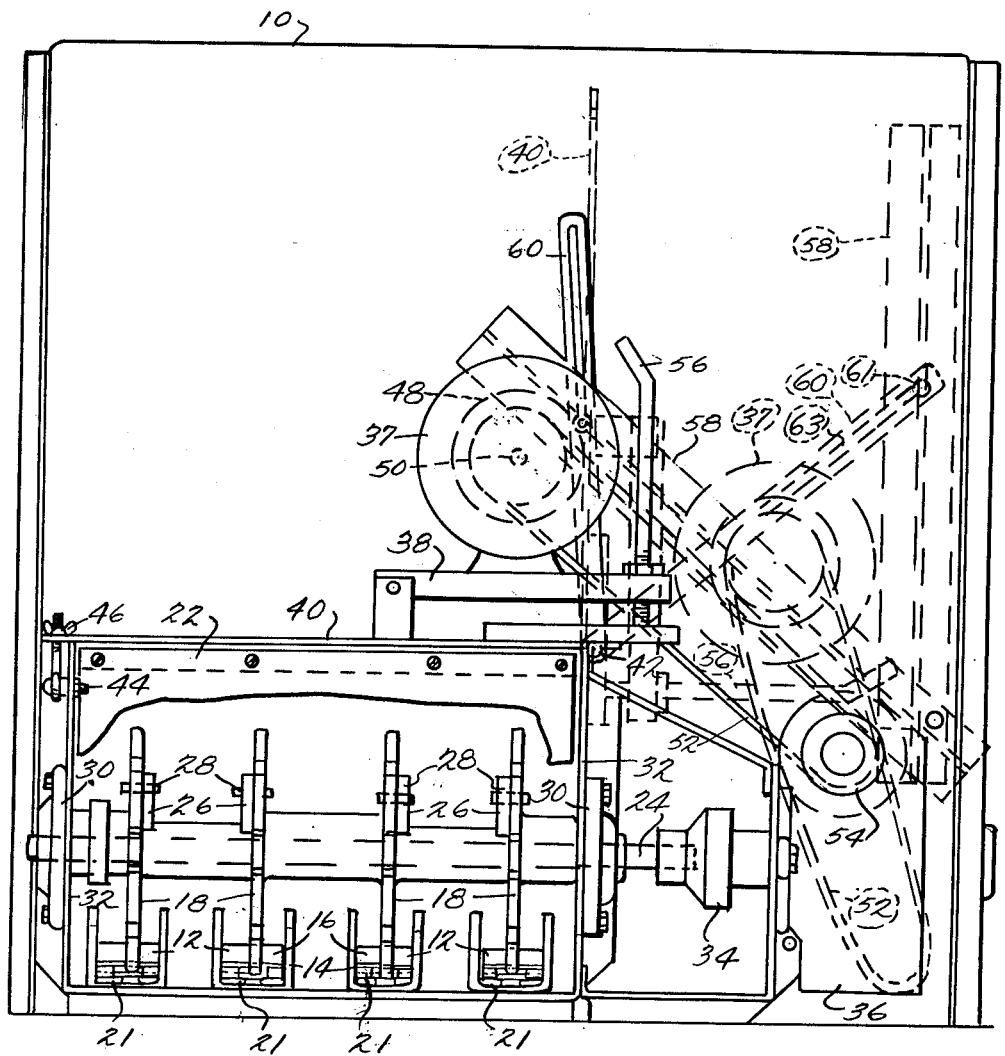
FIGURE 1 is a front elevation view of a conveyer employing the cutoff of the invention. A portion of the drive mechanism housing has been broken away to expose the sprocket members.
Figure 2:
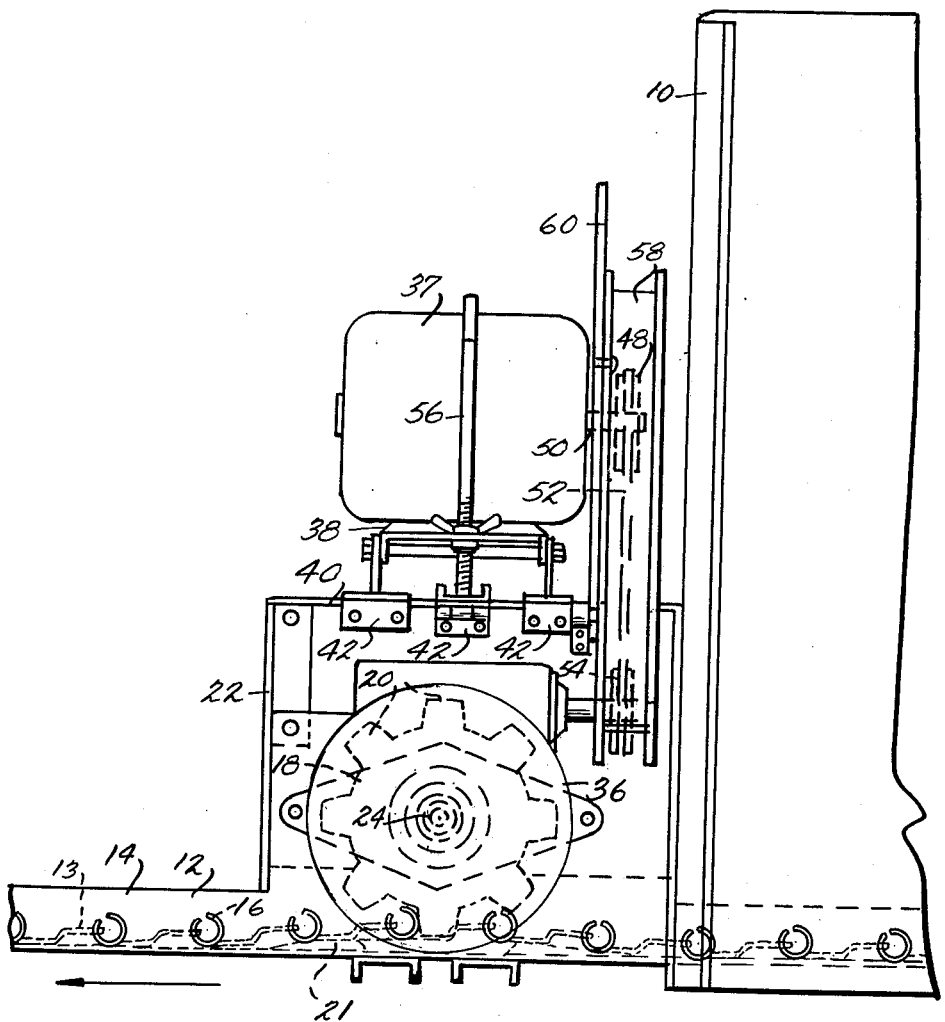
FIGURE 2 is a side elevation view of the conveyer shown in FIGURE 1.

With particular reference to the drawings, a hopper for containing pulverulent material such as livestock or poultry feed is indicated at 10. In the apparatus as shown, four endless conveyers 12 are positioned for conveying feed material from the hopper 10 through open troughs 14 which extend throughout the animal feeding area. Each conveyer 12 is generally comprised of a plurality of interconnected chain links 13 such as those disclosed in our commonly assigned copending application Serial No. 181,584, filed March 22, 1962. As shown therein, each link 13 of the conveyer chain preferably has an integral pusher 16 formed thereon for aiding the advancing of feed in the troughs 14.

The conveyers 12 are each driven by a drive sprocket 18 having a plurality of teeth 20 thereon which interdigitate with the conveyor chain links 13. Wear plates 21 are interposed between the driven chain links 13 and the troughs 14 adjacent the drive sprockets 18. For the protection of the feeding animals and of workmen, the drive sprockets 18 are enclosed within a housing 22. The housing 22 is preferably located adjacent the hopper 10 for convenience in the checking and maintenance of each.

The several sprockets 18 are each coaxially mounted on a drive shaft 24 and suitably keyed thereto as by keys 26 and pins 28 for rotation with the drive shaft 24. The drive shaft is preferably mounted in suitable bearings 30 secured to the side walls 32 of the housing 22. As shown the shaft 24 is linked through a suitable coupling member 34 to the output shaft of a conventional speed reducer mechanism 36. Power is supplied to the speed reducer 36 by an electric motor 37 which, according to the present invention, is secured to an adjustable bracket 38 mounted on the cover plate 40 of the housing 22. The motor 37 may be actuated by a conventional automatic timing mechanism (not shown).

The cover plate 40 is secured to the housing 22 as by hinge members 42 and a latch bolt 44 having a thumb screw 46 thereon although other equivalent latch means could be substituted therefor. A conventional pulley 48, secured to the power takeoff shaft 50 of the electric motor 37 transmits power to the drive shaft 24 through a conventional V-belt 52 extending between the pulley 48 and a second pulley 54 mounted on the input shaft of the speed reducer 36. The V-belt 52 may be tightened as necessary using the adjusting screw 56 on the motor mounting bracket 38. A guard 58 extends over the V-belt 52 to protect animals and workmen.

When a workman wishes to check or perform maintenance work on a conveyer drive employing the automatic cutoff of the invention, he first unlatches the latch bolt 44. The workman then raises the sprocket access cover plate 40 which rotates the motor 37 mounted thereon toward the speed reducer 36. This action moves the belt 52 into a slack, non-driving relationship with the pulleys 48 and 54. At the same time an arm 60, pivotally mounted on the motor mounting bracket 38 and to the guard 58 by a pin and slot arrangement (61 and 63) causes the guard 58 to be rotated away from the belt 52. The raised position of the sprocket access cover 40 together with the slackened belt and raised guard are shown in dashed lines in FIGURE 1.

With the cover in the raised position as shown in FIGURE 1, the workman is assured that although he has forgotten to turn off a safety switch that the drive sprockets are inoperable and will not be actuated to injure him if the automatic timing mechanism should start the motor.

When the workman has performed the maintenance work he simply rotates the cover back into place making sure that the endless V-belt properly seats on the pulleys.

Although the automatic conveyer cutoff has been disclosed in conjunction with a conveyer for animal feed having four endless conveyer chains it should be apparent that the invention is equally applicable to conveyers for moving other materials and having different numbers of endless conveying members.

The specific embodiment of the invention shown herein should not be taken as a limitation of the scope of the invention but only as an illustration of the principles thereof. The invention is limited only by the spirit and scope of the following claims.

What we claim is:

1. A conveyer comprising an endless chain supported in a trough, said chain comprising a plurality of interconnected chain links and said chain having upstanding, integral feed pushing flights on said links, means drivingly engaging said chain, a housing enclosing the chain engaging means, said housing having an access cover hingedly secured thereto, means securing a motor on the exterior of said access cover and a power transmission means communicating the motor with said chain engaging means, said access cover being swingable between a closed position wherein the motor is drivingly engaged with the power transmission means, chain engaging means and endless chain, and said chain engaging means is inaccessible for checking and maintenance, and an opened position wherein the motor having moved with said access cover is thereby disengaged from drivingly engaging the power transmission means, chain engaging means and endless chain and access may be had to the interior of the housing for checking the interior of said housing and performing maintenance on the power transmission means, chain engaging means and endless chain whereby inadvertent actuation of said power transmission means, chain engaging means and endless chain is precluded during said access to the interior of said housing.

2. A conveyer as set forth in claim 1 wherein the chain engaging means is a sprocket drivingly interdigitated with the chain.

3. A conveyor as set forth in claim 2 wherein said power transmission means includes an endless belt, a speed reducer and a drive shaft, the endless belt communicating the motor with the input of the speed reducer and the drive shaft carrying said sprocket and being connected to the output of the speed reducer.

4. A conveyer as set forth in claim 1 wherein the motor is intermittently actuated by an automatic timing means according to a predetermined pattern.

5. A conveyer as set forth in claim 1 wherein said motor securing means is adjustable as to vary the tension of the endless belt.

6. A conveyer comprising an endless chain composed of a plurality of interconnected links, a trough supporting said chain, a sprocket drivingly interdigitated with said chain, said sprocket being carried on a drive shaft, a housing enclosing the sprocket, said housing including a plurality of side walls and a cover hingedly secured to one of said side walls as to surmount the side walls, said shaft being journaled in bearings supported by at least two of said side walls, the drive shaft protruding through one of said side walls, an electric motor secured to said housing cover, a flexible endless belt communicating the motor with the drive shaft, said cover being swingable between a closed position wherein the belt is taut, drivingly engaging the motor with the drive shaft and a raised position wherein the belt is slack thereby disengaging the motor from driving relationship with the drive shaft.

7. A conveyer as set forth in claim 6 additionally comprising a belt guard pivotally positioned adjacent the endless belt as to be swingable away from the belt in coaction with the raising of the housing cover.

References Cited in the file of this patent

UNITED STATES PATENTS

| | | |
|---|---|---|
| 1,554,383 | Stamp | Sept. 22, 1925 |
| 2,948,374 | Husband | Aug. 9, 1960 |